(12) United States Patent
Cheng et al.

(10) Patent No.: US 7,652,802 B2
(45) Date of Patent: Jan. 26, 2010

(54) METHOD AND MODULE FOR SYNTHESIZING IMAGE-SENSING SIGNALS

(75) Inventors: Chun-Huei Cheng, Tucheng (TW); Yuan-Chun Shen, Tucheng (TW)

(73) Assignee: Cheng Uei Precision Industry Co., Ltd., Taipei (TW)

( * ) Notice: Subject to any disclaimer, the term of this patent is extended or adjusted under 35 U.S.C. 154(b) by 953 days.

(21) Appl. No.: 11/305,076

(22) Filed: Dec. 19, 2005

(65) Prior Publication Data

US 2007/0139726 A1    Jun. 21, 2007

(51) Int. Cl.
  *H04N 1/04* (2006.01)
  *H04N 1/36* (2006.01)
(52) U.S. Cl. ...................... 358/474; 358/409
(58) Field of Classification Search ................. 358/474, 358/1.1, 1.9, 1.18, 500, 501, 504, 528, 401, 358/409, 410, 449
See application file for complete search history.

(56) References Cited

U.S. PATENT DOCUMENTS 5,677,527 A * 10/1997 Cheng ..................... 250/208.1

* cited by examiner

*Primary Examiner*—Douglas Q Tran
(74) *Attorney, Agent, or Firm*—Rosenberg, Klein & Lee

(57) ABSTRACT

A module for synthesizing image-sensing signals comprises a first image-sensing element, a second image-sensing element, and an analog adder. The first and the second image-sensing elements are connected in parallel to an input port of the analog adder. The module provides an AD converter whose input port connects an output port of the analog adder. An output port of the AD converter connects a scanner controller. The scanner controller provides a first driving signal and a second driving signal to the first and the second image-sensing elements respectively. The first driving signals and the second driving signals respectively command the first and the second image-sensing elements to alternately output image signals during clock cycle. The image signals outputted from the first and the second image-sensing elements are composed by the analog adder.

9 Claims, 5 Drawing Sheets

METHOD AND MODULE FOR SYNTHESIZING IMAGE-SENSING SIGNALS

BACKGROUND OF THE INVENTION

1. Field of the Invention

The present invention relates generally to a method and module for synthesizing image-sensing signals, and more particularly to a module which utilizes a single Analogy/Digital (AD) converter to receive and deal with two groups of image signals outputted from two image-sensing elements, and a method for synthesizing image signals outputted from two image-sensing elements.

2. The Related Art

Please refer to FIG. 13 and FIG. 14 that show the solution of a kind of high speed two-sided scanner. This solution adopts two independent image-sensing element I and image-sensing element II which acquires the image signals of double sides of a page separately, and matches a corresponding AD converter for each image-sensing element, namely image-sensing element I matches AD converter I, and image-sensing element II matches AD converter II, therefore, the AD converter I and AD converter II receive analogy optical signals outputted from the image-sensing element I and image-sensing element II respectively, and convert the analogy optical signals into the digital signals, then transfer the digital signals to the scanner controller for further handling. Image-sensing elements utilized in this solution may be Charged-Coupled Device (CCD), Complementary Metal-Oxide Semiconductor (CMOS) or Contact Image Sensor (CIS), etc.

Therein, the image-sensing elements that are controlled by the driving signal (include Clock signal PHi1, PHi2, Reset signal RS and Clamp signal CP) outputted from the drive circuit send a pixel in series into the AD converter during a clock cycle T.

However, this solution must adopt extremely complicated scanner controller that is very expensive to deal with two groups of digital image signals at the same time. This causes the cost of the high-speed two-sided scanner at present to remain high, therefore the high speed two-sided scanner is difficult to popularize.

Besides, the resolution of scanners generally is 600 dpi (dot/inch) or more, however, the resolution of 300 dpi is accurate enough for scanners to scan figures of texts and documents. For a scanner of 600 dpi resolution, the output time of the image pixels in every inch of the scanned object will last 600 clock cycles. Therefore, if the demanded resolution for processing is 300 dpi, each side of the scanning page just need to output half pixels of the 600 dpi resolution, namely the total output pixels of two sides scanning from the image-sensing element is equal to the amount of output pixels of single side scanning. It is possible to use the present common scanner controller to realize two-sided scanning functions.

SUMMARY OF THE INVENTION

Therefore, an object of the present invention is to provide a method and module for synthesizing image-sensing signals, which control outputting of the image signals from two image-sensing elements and utilize an analogy adder to compose two groups of image signals, so as to realize two-sided scanning by one AD converter and a common scanner controller.

In order to achieve the above object, the present invention provides a module for synthesizing image-sensing signals scanned from double sides of a paper comprising:

a first image-sensing element for acquiring image-sensing signals of one side of the paper;

a second image-sensing element for acquiring image-sensing signals of the other side of the paper;

an analog adder, the first image-sensing element and the second image-sensing element connected in parallel to an input port of the analog adder;

an analog/digital (AD) converter, whose input port connects an output port of the analog adder; and a scanner controller connected to an output port of the AD converter;

wherein the image-sensing signals acquired by the first image-sensing element and the image-sensing signals acquired by the second image-sensing element are transferred to the analogy adder, the AD converter, and the scanner controller in order.

In order to achieve the above object, the present invention provides a method for synthesizing image-sensing signals scanned from double sides of a paper comprising:

providing a first image-sensing element for acquiring image-sensing signals of one side of the paper;

providing a second image-sensing element for acquiring image-sensing signals of the other side of the paper;

providing an analog adder, and connecting the first image-sensing element and the second image-sensing element in parallel to an input port of the analog adder;

providing an analog/digital (AD) converter, and connecting an input port of the AD converter to an output port of the analog adder;

providing a scanner controller, and connecting an output port of the AD converter to the scanner controller; and, the scanner controller providing a first driving signal to the first image-sensing element to command the first image-sensing element to generate image-sensing signals of one side of the paper, and a second driving signal to the second image-sensing element to command the second image-sensing element to generate image-sensing signals of the other side of the paper, and the driving signals commanding the first image-sensing element and the second image-sensing element to alternately output their respective image-sensing signals to the analogy adder, the AD converter, and the scanner controller in order.

In order to achieve the above object, the present invention provides a method for synthesizing image-sensing signals scanned from double sides of a paper comprising:

providing a first image-sensing element for acquiring image-sensing signals of one side of the paper;

providing a second image-sensing element for acquiring image-sensing signals of the other side of the paper;

providing an analog adder, and connecting the first image-sensing element and the second image-sensing element in parallel to an input port of the analog adder;

providing an analog/digital (AD) converter, and connecting an input port of the AD converter to an output port of the analog adder;

providing a scanner controller, and connecting an output port of the AD converter to the scanner controller; and, the scanner controller providing a first driving signal to the first image-sensing element to command the first image-sensing element to generate image-sensing signals of one side of the paper and output its image-sensing signals, and a second driving signal to the second image-sensing element to command the second image-sensing element to generate image-sensing signals of the other side of the paper and output its image-sensing signals; wherein both of the first driving signal and the second driving signal comprise a clock signal and a reset signal, the reset signal of the first driving signal cancels particular parts of the image-sensing signals outputted by the first image-sensing element during particular clock cycles; and the reset signal of the second driving signal cancels particular parts of the image-sensing signals outputted by the second image-sensing element during different particular clock cycles, the image-sensing signals outputted by the first image-sensing element and the second image-sensing element are transferred to the analogy adder, the AD converter, and the scanner controller in order.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION OF THE PREFERRED EMBODIMENTS

Figure 1:
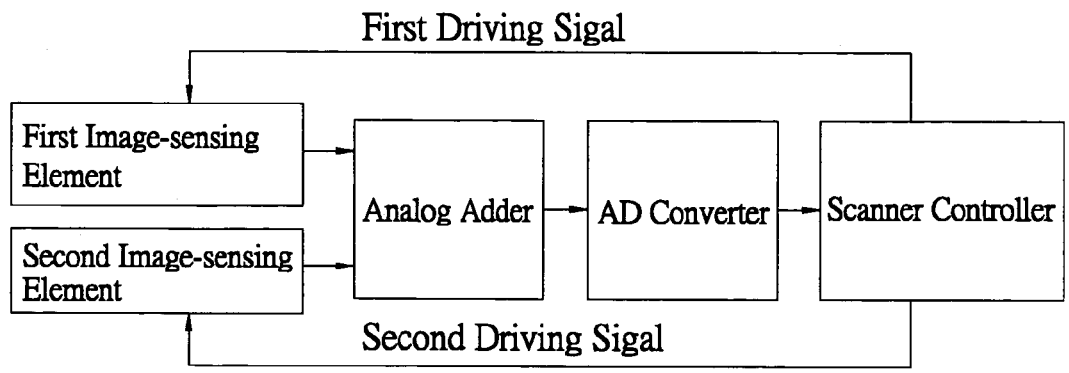
FIG. 1 is a schematic view of a solution of the present invention according to a method and module for synthesizing image-sensing signals.

Please refer to FIG. 1, the module for synthesizing image-sensing signals comprises a first image-sensing element, a second image-sensing element, an analog adder, an AD converter and a scanner controller. During scanning double sides of a paper, the scanner controller provides a first driving signal and a second driving signal to the first image-sensing element and the second image-sensing element respectively so as to acquire the analogy image signals of double sides of the page separately. After the image signals are transferred to the analogy adder for composing, the composed image signals is delivered to the AD converter for analogy/digital converting and is transferred to the scanner controller for further handling.

Figure 2:
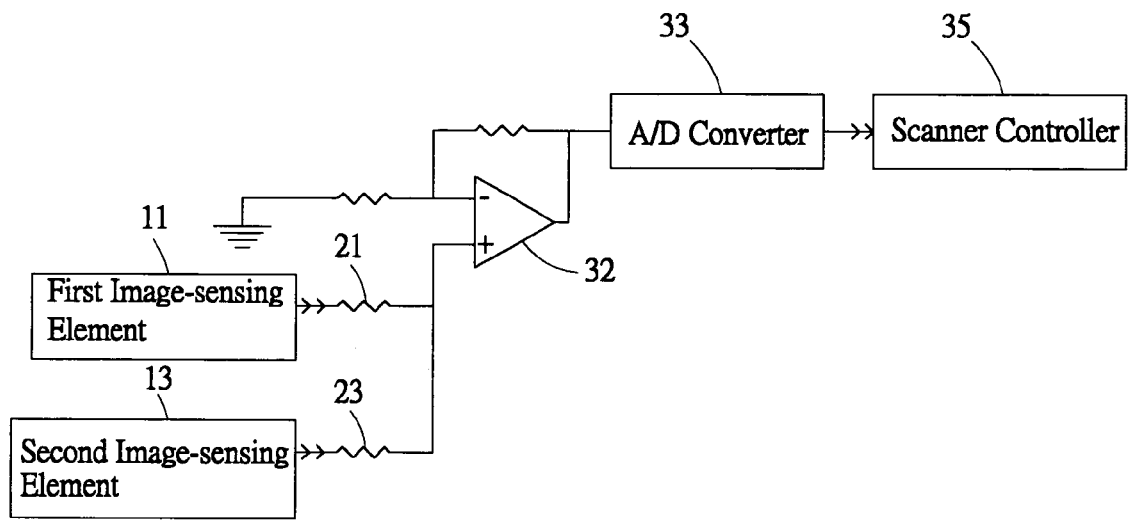
FIG. 2 is a circuit diagram of the first embodiment of the module for synthesizing image-sensing signals.

Please refer to FIG. 2, the module for synthesizing image-sensing signals provides a first image-sensing element 11 and a second image-sensing element 13 to acquire image signals of double sides of the page. The first image-sensing element 11 and the second image-sensing element 13 are connected in parallel to an input port of an operational amplifier 32. An AD converter 33 whose input port connects an output port of the operational amplifier 32 is provided for analogy/digital converting, and the output port of the AD converter 33 is connected to the scanner controller 35. Furthermore, a first resistance 21 is connected serially between the first image-sensing element 11 and the operational amplifier 32, and a second resistance 23 is connected serially between the second image-sensing element 13 and the operational amplifier 32. Therefore, the analogy image signals outputted from the first image-sensing element 11 and the second image-sensing element 13 are transferred to the operational amplifier 32 for synthesizing and are delivered to the AD converter 33. The AD converter 33 converts the analogy image signals to digital image signals and transfers the digital image signals to the scanner controller 35.

Figure 3:
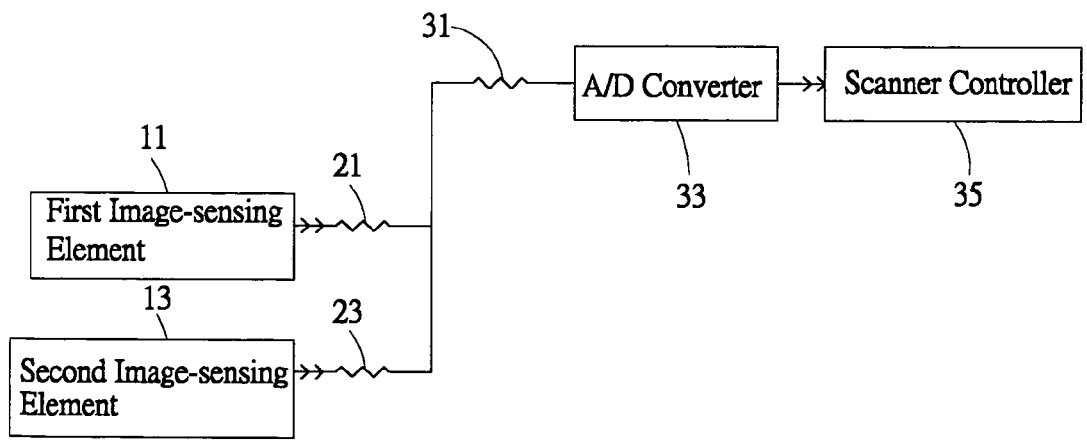
FIG. 3 is a circuit diagram of the second embodiment of the module for synthesizing image-sensing signals.

Please refer to FIG. 3, the first image-sensing element 11 and the second image-sensing element 13 are connected in parallel to one end of a synthesizing resistance 31. An AD converter 33 whose input port connects another end of the synthesizing resistance 31 is provided for analogy/digital converting, and an output port of the AD converter 33 is connected to the scanner controller 35. Furthermore, a first resistance 21 is connected serially between the first image-sensing element 11 and the synthesizing resistance 31, and a second resistance 23 is connected serially between the second image-sensing element 13 and the synthesizing resistance 31. Therefore, the image signals outputted from the first image-sensing element 11 and the second image-sensing element 13 are transferred to the synthesizing resistance 31, the AD converter 33 and the scanner controller 35 in order.

Figure 4:
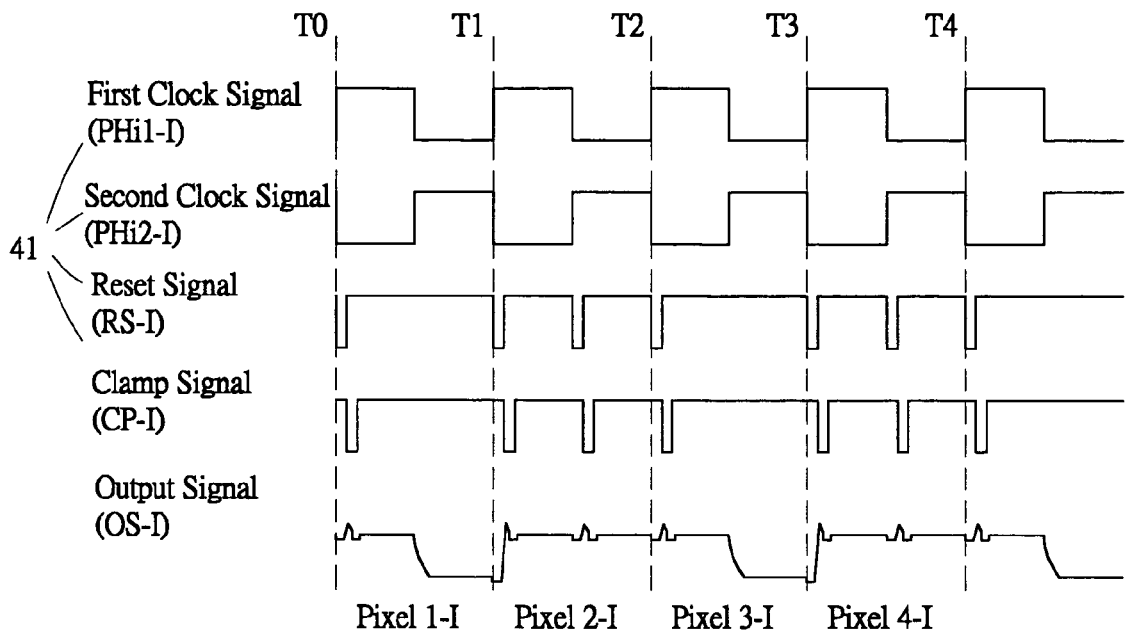
FIG. 4 and FIG. 5 are diagrammatic views showing the waveforms of the driving signals PHi1-I, PHi2-I, RS-I, CP-II, PHi1-II, PHi2-II, RS-II and CP-II according to the first embodiment of the method for synthesizing image-sensing signals.
Figure 5:
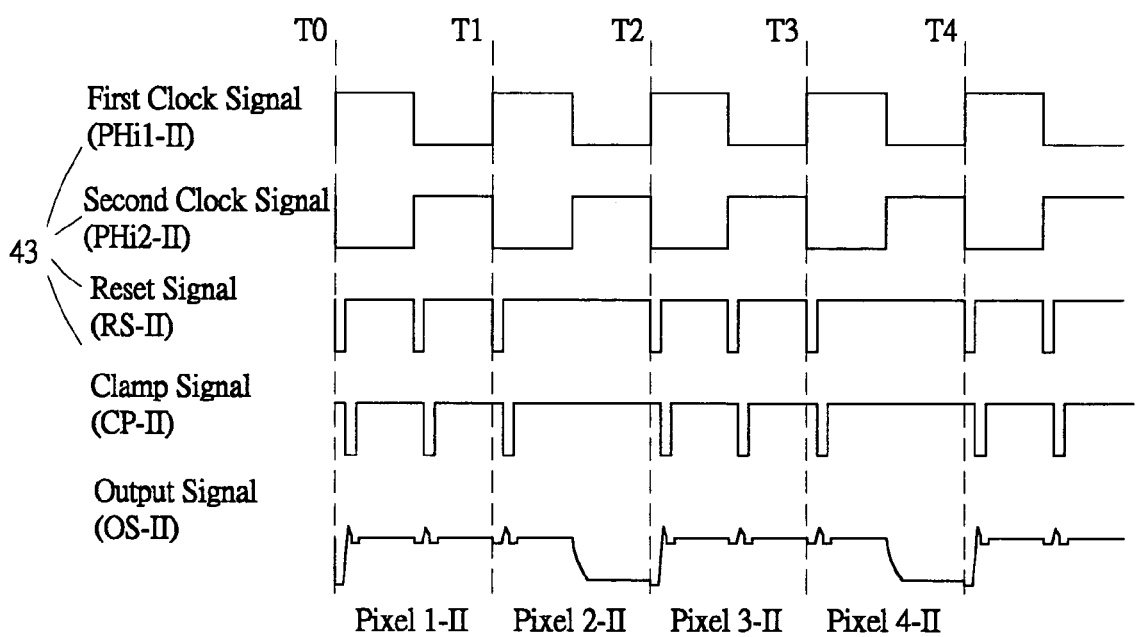

Please refer to FIG. 4 and FIG. 5, the first embodiment of the method for synthesizing image-sensing signals provides a first driving signal 41 and a second driving signal 43 to the first image-sensing element 11 and the second image-sensing element 13 respectively so as to output the output signal OS-I and OS-II. Both of the first driving signal 41 and the second driving signal 43 comprise clock signal and control signal, and the clock signal further comprises first clock signal PHi1-I/PHi1-II and second clock signal PHi2-I/Phi2-II, and the control signal further comprises reset signal RS-I/RS-II and clamp signal CP-I/CP-II. The clock signal such as PHi1-I, PHi2-I, Phi1-II and Phi2-II is used to control the image signals outputting, and the image-sensing element outputs a pixel once the voltage of the clock signal switched. The reset signal such as RS-I and RS-II is used to cancel pixel signals, and the outputting pixel is canceled once the voltage of the reset signal switched. The first image-sensing element 11 that is controlled by the first driving signal 41 outputs odd pixels 1-I and 3-I during odd cycles T0-T1 and T2-T3, and the even pixels 2-I and 4-I are canceled by the reset signal RS-I. The second image-sensing element 13 that is controlled by the second driving signal 43 outputs even pixels 2-II and 4-II during even cycles T1-T2 and T3-T4, and the odd pixels 1-II and 3-II are canceled by the reset signal RS-II. For brevity, each image-sensing element outputting only 2 pixels is shown in FIG. 4 and FIG. 5.

Figure 6:
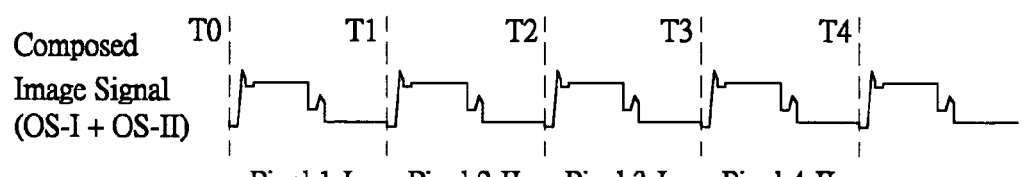
FIG. 6 shows the output waveform of the synthesized signals according to the first embodiment of the method for synthesizing image-sensing signals.

The first image-sensing element 11 and the second image-sensing element 13 respectively output the output signal OS-I and OS-II into the operational amplifier 32 or the synthesizing resistance 31 during different clock cycles. The operational amplifier 32 or the synthesizing resistance 31 output a composed image signals (OS-I+OS-II) as FIG. 6 shown. The composed image signals (OS-I+OS-II) satisfy the customer demands, besides, it can be handled by common scanner controller.

As shown in FIG. 4 and FIG. 5, the first image-sensing element 11 and the second image-sensing element 13 output gained image signals during alternate clock cycle, namely the first image-sensing element 11 outputs gained image signals during odd clock cycles, and the second image-sensing element 13 outputs image signals during even clock cycles. As another equal solution, the first image-sensing element 11 outputs gained image signals during even clock cycles, and the second image-sensing element 13 outputs gained image signals during odd clock cycles.

Figure 7:
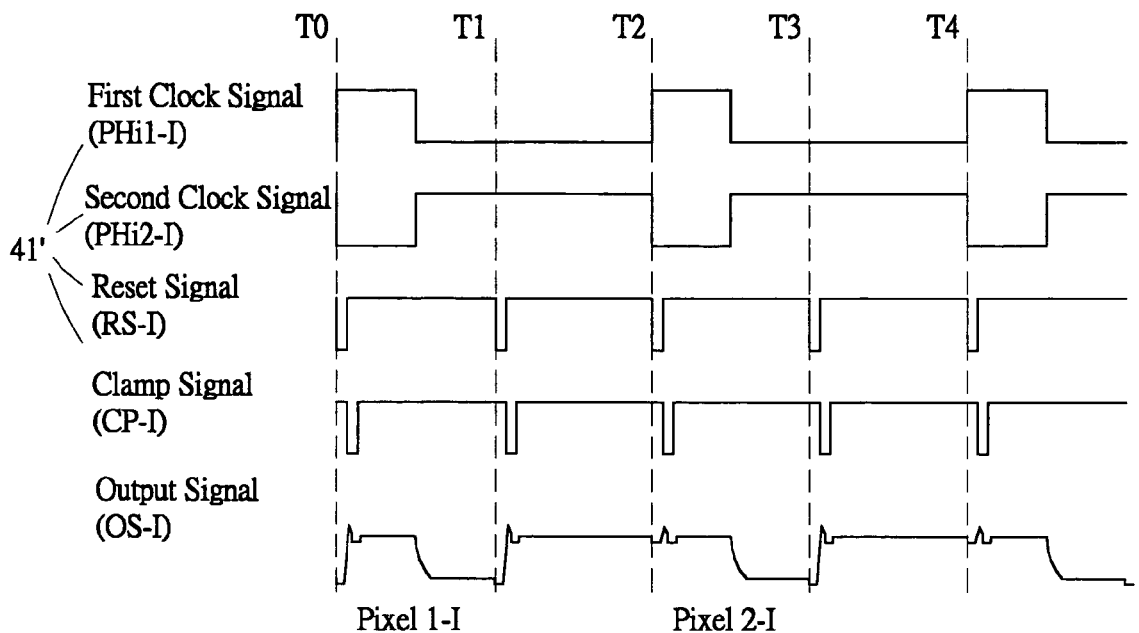
FIGS. 7, 8 and 9 are views similar to FIGS. 4, 5 and 6 showing a second embodiment of the method for synthesizing image-sensing signals.
Figure 8:
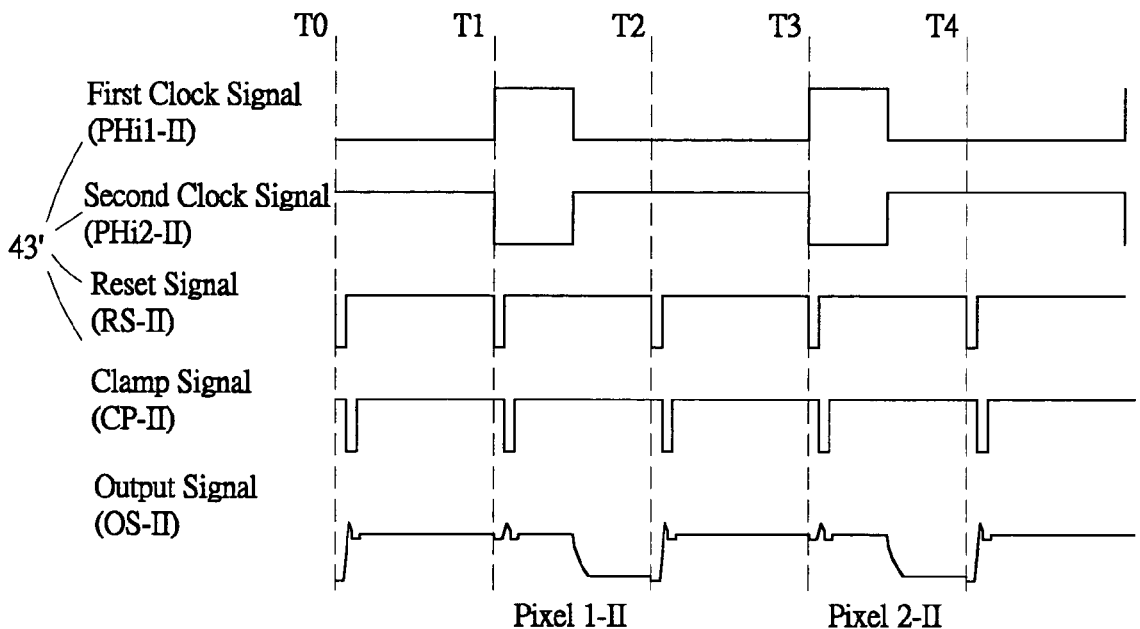

Please refer to FIG. 7 and FIG. 8, the second embodiment of the method for synthesizing image-sensing signals provides a first driving signal 41' and a second driving signal 43' to the first image-sensing element 11 and the second image-sensing element 13 respectively so as to output the output signal OS-I and OS-II. The difference between the duty cycles of the first clock signal PHi1-I and the duty cycles of the second clock signal PHi1-II is one cycle T, similarly, and the difference between the duty cycles of the first clock signal PHi2-I and the duty cycles of the second clock signal PHi2-II is one cycle T too.

As shown in FIG. 7 and FIG. 8, the first image-sensing element 11 that is controlled by the first driving signal 41' outputs pixels 1-I, 2-I during odd clock cycles T0-T1, T2-T3, and the second image-sensing element 13 that is controlled by the second driving signal 43' outputs pixels 1-II, 2-II during even clock cycles T1-T2, T3-T4. As another equal solution, the first image-sensing element 11 outputs pixels during even clock cycles T1-T2, T3-T4, and the second image-sensing element 13 outputs pixels during odd clock cycles T0-T1, T2-T3.

For brevity, each image-sensing element outputting only 2 pixels is shown in FIG. 7 and FIG. 8.

Figure 9:
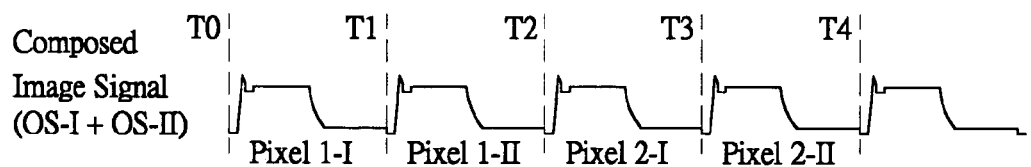

The output signal OS-I and OS-II respectively outputted from the first image-sensing element 11 and the second image-sensing element 13 are transferred into the operational amplifier 32 or the synthesizing resistance 31 for synthesizing so as to output a composed image signal (OS-I+OS-II) as FIG. 9 shown. The composed image signal (OS-I+OS-II) is delivered to the AD converter 33 and the scanner controller 35. In this embodiment, the composed image signal (OS-I+OS-II) can be also handled by common scanner controller.

Comparing to the first embodiment, the driving signal of the second embodiment changes the outputting time point through adjusting switch cycles of the clock cycles PHi1-I, PHi1-II, Phi2-I and Phi2-II to attain higher resolution without pixel losing.

Figure 10:
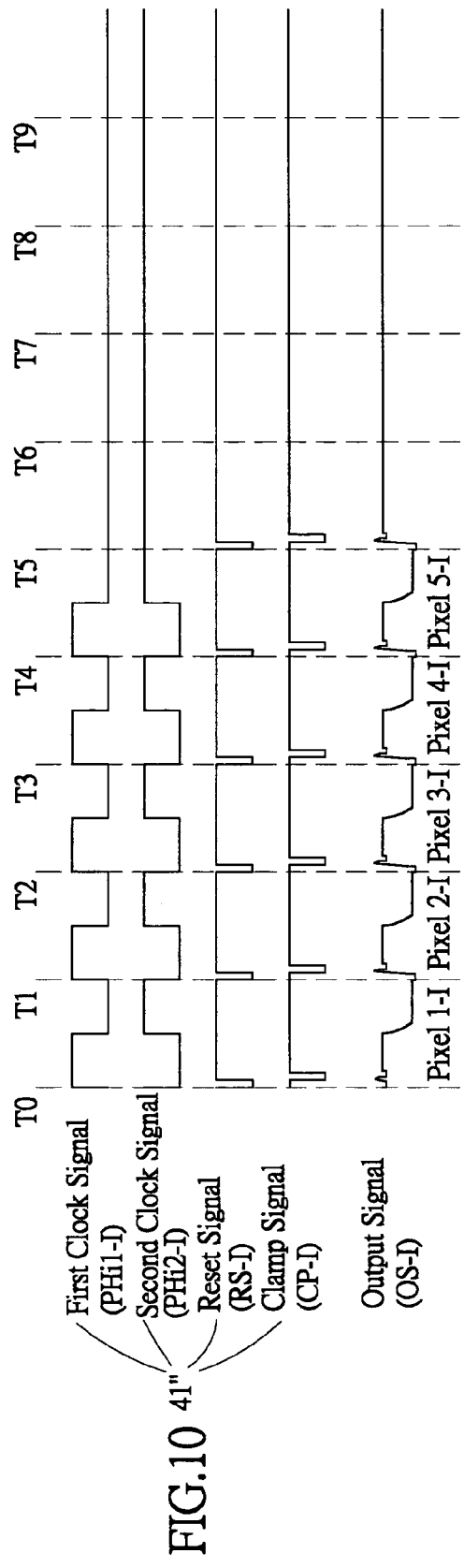
FIGS. 10, 11 and 12 are views similar to FIGS. 4, 5 and 6 showing a third embodiment of the method for synthesizing image-sensing signals.
Figure 11:
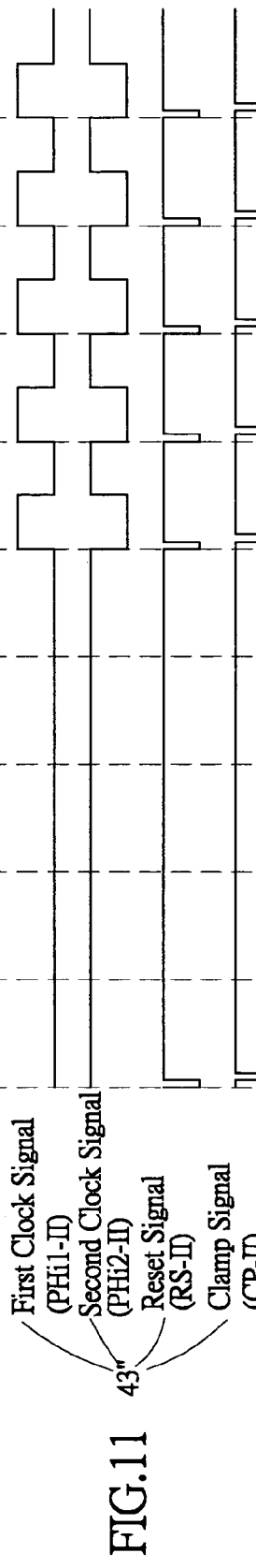

Please refer to FIG. 10 and FIG. 11, the third embodiment of the method for synthesizing image-sensing signals provides a first driving signal 41" and a second driving signal 43" to the first image-sensing element 11 and the second image-sensing element 13 respectively so as to output the output signal OS-I and OS-II. The first image-sensing element 11 that is controlled by the first driving signal 41" outputs all gained pixels during cycles T0-T5, besides, the voltage of the clock signal Phi1-II and Phi2-II are kept constant at the same time, namely the second image-sensing element 13 stops outputting image pixels. Then, the second image-sensing element 13 that is controlled by the second driving signal 43" outputs all gained pixels during clock cycles T5-T10, and the voltage of the clock signal Phi1-I and Phi2-I are kept constant at the same time, namely the first image-sensing element 11 stops outputting image pixels. For brevity, each image-sensing element outputting only 5 pixels is shown in FIG. 10 and FIG. 11.

Figure 12:
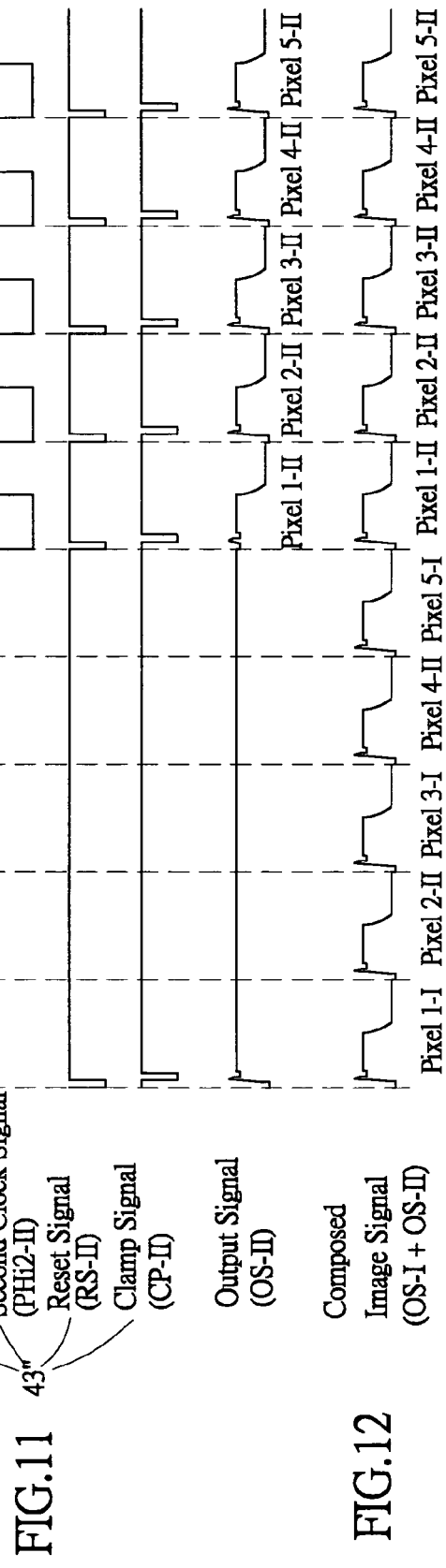
Figure 13:
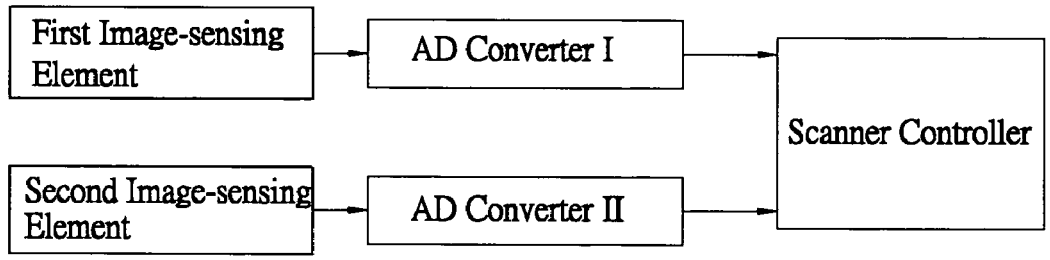
FIG. 13 is a schematic view of the existing two-sided scanner.
Figure 14:
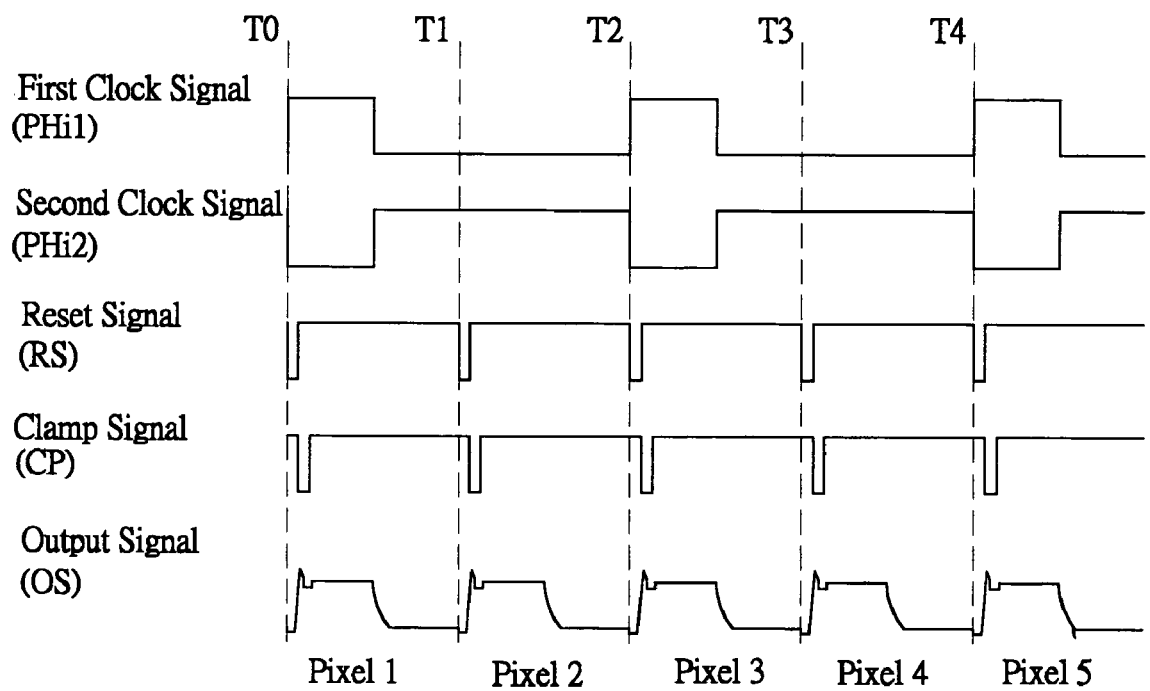
FIG. 14 is a diagrammatic view showing a prior art.

The output signal OS-I and OS-II respectively outputted from the first image-sensing element 11 and the second image-sensing element 13 are transferred into the operational amplifier 32 or the synthesizing resistance 31 for synthesizing so as to output a composed image signal (OS-I+OS-II) as FIG. 12 shown. The composed image signal (OS-I+OS-II) is delivered to the AD converter 33 and the scanner controller 35. In this embodiment, the composed image signal (OS-I+OS-II) can also be handled by common scanner controller, moreover, the possible interference reduced during transmitting.

This invention has been described with reference to specific embodiments. This description is not to be construed in a limiting sense. For example, those skilled in the art will recognize modifications and alterations that may be made to the embodiment illustrated herein. However, it is contemplated that such modifications can be made without departing the scope and spirit of the invention as defined in the following claims.

What is claimed is:

1. A module for synthesizing image-sensing signals scanned from double sides of a paper comprising:
   a first image-sensing element for acquiring image-sensing signals of one side of the paper;
   a second image-sensing element for acquiring image-sensing signals of the other side of the paper;
   an analog adder, the first image-sensing element and the second image-sensing element connected in parallel to an input port of the analog adder;
   an analog/digital (AD) converter, whose input port connects an output port of the analog adder; and
   a scanner controller connected to an output port of the AD converter;
   wherein the image-sensing signals acquired by the first image-sensing element and the image-sensing signals acquired by the second image-sensing element are transferred to the analogy adder, the AD converter, and the scanner controller in order.

2. The module as claimed in claim 1, wherein a first resistance is connected serially between the first image-sensing element and the analog adder, and a second resistance is connected serially between the second image-sensing element and the analog adder.

3. The module as claimed in claim 1, wherein said analog adder is an operational amplifier.

4. The module as claimed in claim 1, wherein said analog adder is a resistance.

5. A method for synthesizing image-sensing signals scanned from double sides of a paper comprising:
   providing a first image-sensing element for acquiring image-sensing signals of one side of the paper;
   providing a second image-sensing element for acquiring image-sensing signals of the other side of the paper;
   providing an analog adder, and connecting the first image-sensing element and the second image-sensing element in parallel to an input port of the analog adder;
   providing an analog/digital (AD) converter, and connecting an input port of the AD converter to an output port of the analog adder;
   providing a scanner controller, and connecting an output port of the AD converter to the scanner controller; and,
   the scanner controller providing a first driving signal to the first image-sensing element to command the first image-sensing element to generate image-sensing signals of one side of the paper, and a second driving signal to the second image-sensing element to command the second image-sensing element to generate image-sensing signals of the other side of the paper, and the driving signals commanding the first image-sensing element and the second image-sensing element to alternately output their respective image-sensing signals to the analogy adder, the AD converter, and the scanner controller in order.

6. The method as claimed in claim 5, wherein both of the first driving signal and the second driving signal comprise a first clock signal and a second clock signal, the difference between the duty cycles of the first clock signal of the first driving signal and that of the second driving signal is one cycle, and the difference between the duty cycles of the second clock signal of the first driving signal and that of the second driving signal is one cycle too.

7. The method as claimed in claim 5, wherein both of the first driving signal and the second driving signal comprise a clock signal, the voltage of the clock signal of the second driving signal keeps constant while the first image-sensing element outputs its image-sensing signals; then, the voltage of the clock signal of the first driving signal keeps constant while the second image-sensing element outputs its image-sensing signals.

8. A method for synthesizing image-sensing signals scanned from double sides of a paper comprising:
  providing a first image-sensing element for acquiring image-sensing signals of one side of the paper;
  providing a second image-sensing element for acquiring image-sensing signals of the other side of the paper;
  providing an analog adder, and connecting the first image-sensing element and the second image-sensing element in parallel to an input port of the analog adder;
  providing an analog/digital (AD) converter, and connecting an input port of the AD converter to an output port of the analog adder;
  providing a scanner controller, and connecting an output port of the AD converter to the scanner controller; and,
  the scanner controller providing a first driving signal to the first image-sensing element to command the first image-sensing element to generate image-sensing signals of one side of the paper and output its image-sensing signals, and a second driving signal to the second image-sensing element to command the second image-sensing element to generate image-sensing signals of the other side of the paper and output its image-sensing signals; wherein
  both of the first driving signal and the second driving signal comprise a clock signal and a reset signal, the reset signal of the first driving signal cancels particular parts of the image-sensing signals outputted by the first image-sensing element during particular clock cycles; and the reset signal of the second driving signal cancels particular parts of the image-sensing signals outputted by the second image-sensing element during different particular clock cycles, the image-sensing signals outputted by the first image-sensing element and the second image-sensing element are transferred to the analogy adder, the AD converter, and the scanner controller in order.

9. The method as claimed in claim 8, wherein the reset signal of the first driving signal cancels the parts of the image-sensing signals outputted by the first image-sensing element during even clock cycles, and the reset signal of the second driving signal cancels the parts of the image-sensing signals outputted by the second image-sensing element during odd clock cycles.

* * * * *